May 1, 1956  W. C. KINNEY  2,743,899
IRRIGATION PIPE JOINT WITH VALVED GASKET
Filed Oct. 15, 1951
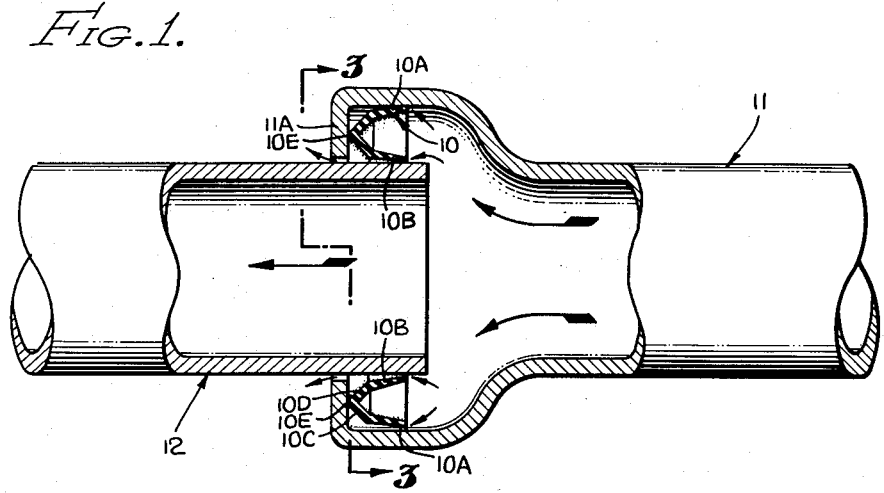
Fig. 1.
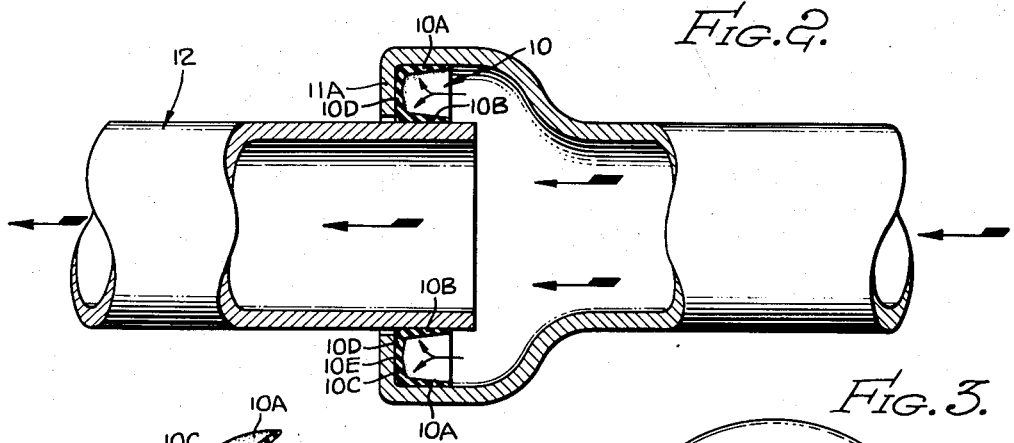
Fig. 2.
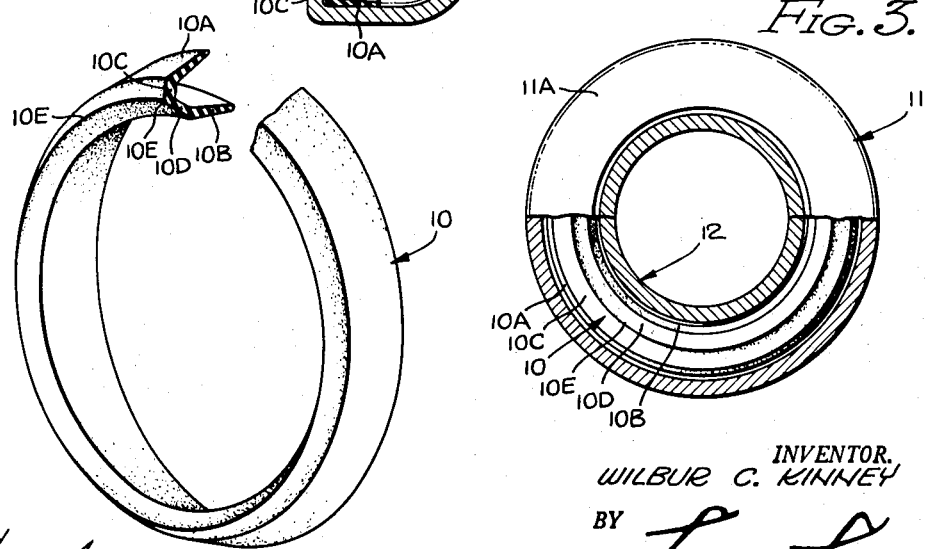
Fig. 3.
Fig. 4.
INVENTOR.
WILBUR C. KINNEY
BY Lyon+Lyon
ATTORNEYS

United States Patent Office 2,743,899
Patented May 1, 1956

2,743,899
IRRIGATION PIPE JOINT WITH VALVED GASKET
Wilbur C. Kinney, Vista, Calif.

Application October 15, 1951, Serial No. 251,369

1 Claim. (Cl. 251—149)

The present invention relates to gaskets particularly useful in providing seals between various sections of quickly attachable and detachable pipe sections in irrigation equipment.

Presently, in irrigating land, long pipe lines of metal tubing are used. The pipe lines consist generally of a plurality of quickly attachable and detachable sections with gasket means between the various sections to seal the same. It is desirable in irrigation operations to move the pipe line to regions where needed. It is desirable to perform these operations quickly, but one of the factors necessitating expenditure of large amounts of time resides in the factor that the line must be drained of residual water before it is disassembled.

It is therefore one of the objects of the present invention to provide an improved gasket construction whereby the residual water in the pipe line may be drained therefrom at each one of the gaskets, using a relatively small amount of effort.

Another object of the present invention is to provide an improved gasket which produces a self-sealing effect under application of pressure, and which produces a watertight seal even though the pressure is subsequently diminished.

Another object of the present invention is to provide an improved new gasket means which is self-locking in the space which it is intended to seal under the application of pressure thereto, such gasket means remaining in such self-locking condition even though the pressure is subsequently reduced.

The features of the present invention which are believed to be novel are set forth with particularity in the appended claim. This invention itself, both as to its organization and manner of operation, together with further objects and advantages thereof, may be best understood by reference to the following description taken in connection with the accompanying drawings in which:

Figure 1 is a view, partly in section and partly in elevation, of a pipe coupling arrangement incorporating improved gasket means in accordance with the present invention, the gasket being shown in the position it assumes initially when a relatively small pressure exists in the pipe line;

Figure 2 is a view similar to the view shown in Figure 1, but shows the same gasket means in the extended locked position it assumes when there is a relatively high pressure in the pipe line, or when such high pressure is subsequently diminished or reduced to an atmospheric pressure;

Figure 3 is a sectional view taken generally on the line 3—3 of Figure 1; and

Figure 4 is a perspective view of the annular gasket, fragmented however to illustrate the cross sectional conformation thereof.

The gasket 10 shown in the different figures is annular, and is of resilient nature such as, for example, rubber. Specifically, the cross section of such annular gasket is defined by a pair of forwardly converging flanges 10A, 10B which are joined by a pair of integrally formed angularly disposed web portions 10C, 10D, which define the circular edge 10E at their intersection. This edge 10E, in use of the gasket, serves generally as a fulcrum about which such web portions 10C, 10D are pivoted from their normal position shown in Figure 1 to the self-locking position shown in Figure 2, in a manner described in greater detail hereinafter.

The web portions 10C, 10D thus form a generally V-shaped base portion engaging the ring-shaped flange 11A on the pipe section 11, while the two flange portions 10A, 10B engage respectively the inner flared wall of the outer pipe section 11, and the outer wall of the inner pipe section 12.

The gasket shown in Figure 1 is deformed, upon the presence of sufficient pressure in the pipe sections, to assume the position shown in Figure 2.

It is observed that in the normal position shown in Figure 1, when no pressure is applied, the annular forward edge 10E contacts the ring-shaped flange 11A essentially on a line contact. However, upon application of pressure, these two base portions 10C, 10D pivot essentially about this line of contact 10E and are wedged between the coaxial walls of the inner and outer pipe sections 11, 12 to provide a seal therewith. Such deformation as shown in Figure 2 is permanent in character in that the gasket 10 does not return to its position shown in Figure 1 when a pressure within the pipe sections is diminished to atmospheric pressure, i. e., the pressure existing externally of the pipe sections. Thus, the gasket 10, in its deformed condition, provides a non-draining seal.

In order to break the non-draining seal thus provided, it is necessary that the pipe section 11, 12 be moved relative to one another; for example, by moving the pipe section 12 further inwardly into the pipe section 11.

It is observed that in order to produce this self-sealing condition, the combined lengths of the web portions 10C, 10B is equal substantially to the spacing between the coaxial pipe sections 11, 12, and that such web portions are allowed to pivot about the line 10E under the application of pressure, so that these web portions 10C, 10D are wedged between the inner and outer pipe sections.

While the particular embodiments of the present invention have been shown and described, it will be obvious to those skilled in the art that changes and modifications may be made without departing from this invention in its broader aspects and, therefore, the aim in the appended claim is to cover all such changes and modifications as fall within the true spirit and scope of this invention.

I claim:

In an arrangement of the character described, an inner pipe section, an outer coaxially arranged pipe section, said outer pipe section having a ring-shoped flanges, a gasket member disposed between said inner and outer pipe sections, said gasket member comprising a pair of radially spaced flanges engaging respectively the inner and outer pipe sections and having a pair of web members angularly disposed relative to said flanges, with said web members intersecting generally on a circle, said web members engaging said ring-shaped flange normally on a line contact and on said circle, and the combined lengths of said web members being substantially equal to the radial spacing between the coaxially arranged inner and outer pipe sections, said web members being deformable to fulcrum about said line contact and to become wedged between said inner and outer pipe sections upon application of pressure within said inner pipe section above a predetermined amount.

References Cited in the file of this patent
UNITED STATES PATENTS

| | | |
|---|---|---|
| 1,246,089 | Greenoe | Nov. 13, 1917 |
| 2,063,839 | Crooks | Dec. 8, 1936 |
| 2,278,074 | Hauf | Mar. 31, 1942 |
| 2,652,282 | Willetts | Sept. 15, 1953 |